US009623346B2

(12) United States Patent
Koczo et al.

(10) Patent No.: US 9,623,346 B2
(45) Date of Patent: *Apr. 18, 2017

(54) COMPOSITIONS AND METHODS FOR SEPARATING EMULSIONS USING THE SAME

(75) Inventors: Kalman Koczo, Suffern, NY (US); Benjamin Falk, Yorktown Heights, NY (US); Antonio Palumbo, Syracuse (IT)

(73) Assignee: Momentive Performance Materials Inc., Waterford, NY (US)

( * ) Notice: Subject to any disclaimer, the term of this patent is extended or adjusted under 35 U.S.C. 154(b) by 1130 days.

This patent is subject to a terminal disclaimer.

(21) Appl. No.: 12/848,514

(22) Filed: Aug. 2, 2010

(65) Prior Publication Data
US 2012/0024759 A1 Feb. 2, 2012

(51) Int. Cl.
*B01D 17/05* (2006.01)
*B01D 17/04* (2006.01)
*C10G 33/04* (2006.01)
*C08L 83/04* (2006.01)
*C08L 83/12* (2006.01)
*C08G 77/14* (2006.01)
*C08G 77/46* (2006.01)

(52) U.S. Cl.
CPC ............ *B01D 17/047* (2013.01); *C08L 83/04* (2013.01); *C08L 83/12* (2013.01); *C10G 33/04* (2013.01); *C08G 77/14* (2013.01); *C08G 77/46* (2013.01)

(58) Field of Classification Search
CPC ....... B01D 17/047; C10G 33/04; C08L 83/12; C08L 83/04; C08G 77/46; C08G 77/14
USPC ............... 516/144; 556/431, 434, 435, 445; 525/474, 476, 478, 477
See application file for complete search history.

(56) References Cited

U.S. PATENT DOCUMENTS

| 3,299,112 | A | * | 1/1967 | Bailey ........................... 516/199 |
| 3,503,943 | A | * | 3/1970 | O'Farrell et al. .......... 525/331.7 |
| 3,677,962 | A | | 7/1972 | Koerner et al. |
| 4,059,606 | A | * | 11/1977 | Walsingham et al. ........ 556/444 |
| 4,183,820 | A | | 1/1980 | Theile et al. |
| 4,514,315 | A | * | 4/1985 | Matulewicz .......... C23F 11/173 252/389.31 |
| 4,962,218 | A | | 10/1990 | Blevins et al. |
| 5,004,559 | A | | 4/1991 | Koerner et al. |
| 5,026,891 | A | * | 6/1991 | Colas et al. .................... 556/413 |
| 5,032,662 | A | * | 7/1991 | Berger .............. B01D 19/0409 528/25 |
| 5,045,571 | A | | 9/1991 | Blevins et al. |
| 5,110,972 | A | | 5/1992 | Greenlee |
| 5,472,686 | A | * | 12/1995 | Tsubaki ................. A61K 8/891 424/59 |
| 5,512,640 | A | * | 4/1996 | Osawa et al. ................. 525/476 |
| 5,750,589 | A | * | 5/1998 | Zech .................... C08G 65/336 433/214 |
| 6,448,329 | B1 | * | 9/2002 | Hirschi ................... C08L 83/04 524/437 |
| 6,541,593 | B1 | * | 4/2003 | Jyono et al. ..................... 528/15 |
| 7,259,220 | B1 | * | 8/2007 | Farris et al. ..................... 528/15 |
| 7,700,797 | B2 | * | 4/2010 | Leatherman ........... A01N 25/30 424/401 |
| 7,829,734 | B2 | * | 11/2010 | Farris et al. ................... 556/434 |
| 8,198,337 | B2 | | 6/2012 | Falk et al. |
| 2005/0084467 | A1 | * | 4/2005 | Miyanaga .............. A61K 8/894 424/70.12 |
| 2007/0249560 | A1 | * | 10/2007 | Leatherman ........... A01N 25/30 514/63 |
| 2007/0269467 | A1 | * | 11/2007 | Leatherman ........... A01N 25/30 424/401 |
| 2009/0093598 | A1 | * | 4/2009 | Venzmer ................ C08G 77/46 525/479 |
| 2011/0015075 | A1 | * | 1/2011 | Leatherman et al. ........ 504/358 |
| 2013/0197108 | A1 | * | 8/2013 | Koczo et al. ................. 516/144 |

FOREIGN PATENT DOCUMENTS

| EP | 1 496 080 A1 * | 1/2005 |
| GB | 1439793 | 6/1976 |
| WO | WO 2009/085300 A2 * | 7/2009 |

OTHER PUBLICATIONS

Fröhlich, Peter, and Martin Bertau. "Polysiloxanes, Biocatalytic Functionalization.", Encyclopedia of Industrial Biotechnology: Bioprocess, Bioseparation, and Cell Technology (published online Apr. 15, 2010), pp. 3976-3988.*

* cited by examiner

*Primary Examiner* — Daniel S Metzmaier
(74) *Attorney, Agent, or Firm* — Joseph S. Ostroff

(57) ABSTRACT

The present invention provides for a demulsifying composition comprising a blend of a) an emulsion; and b) a demulsifying-effective amount of a silicon containing copolymer. The present invention also provides for a method for separating emulsions using the demulsifying composition discussed.

14 Claims, No Drawings

COMPOSITIONS AND METHODS FOR SEPARATING EMULSIONS USING THE SAME

FIELD OF THE INVENTION

The present invention relates to silicon containing copolymers, demulsifying compositions comprising the silicon containing copolymers, processes for their preparation, and their use as demulsifying agents.

BACKGROUND OF THE INVENTION

It is well known that emulsions often cause difficulties in industrial processing operations. For this reason, the emulsified components need to be separated. Often, one or more chemicals, known as demulsifiers, are used for this purpose.

For example, during crude oil processing, it is commonplace for water to become emulsified in the oil. The emulsified water is problematic from several standpoints, most notably as a corrosive to pipelines and as a disruptor to oil distillation processes. The resulting water-in-oil emulsion is typically highly stable as a result of natural surfactants (e.g., naphthenic acids, asphaltenes, and resins) in the crude oil.

To disrupt the stabilized water-in-oil emulsions in crude oil, specialized organic and silicone demulsifiers have been used. See, for example, U.S. Pat. Nos. 5,004,559, 4,183,820, 3,677,962, and British Patent No. GB 1439793, all of which disclose the use of polyoxyalkylene-polysiloxane copolymers as demulsifiers in crude oil or petroleum processing. However, there remains a need for demulsifiers capable of breaking and/or separating such emulsions more effectively.

SUMMARY OF THE INVENTION

A demulsifying composition is provided herein, said demulsifying composition comprising a blend of (a) an emulsion; and (b) a demulsifying-effective amount of a silicon containing co-polymer comprising at least one compound having the following formula

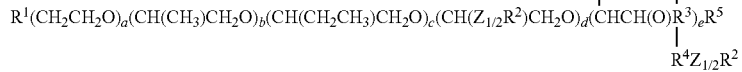
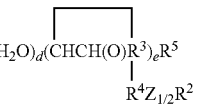

where $R^2$ is a group defined as $M_fD_gT_hQ_iR^6_j$ with
$M=R^7R^6R^9SiZ_{1/2}$,
$D=R^{10}/R^{11}SiZ_{2/2}$,
$T=R^{12}SiZ_{3/2}$,
$Q=SiZ_{4/2}$,
$R^6=—(CH_2)_{1/2}(R^{13})_k(CH_2)_{1/2}—$,
wherein $R^1$ is independently selected from —OH) or —OC(O)CH$_3$ or a monovalent hydrocarbon radical optionally containing heteroatoms and hydroxyl groups having 1 to about 40 carbon atoms, $R^5$ is independently selected from hydrogen or a —C(O)CH$_3$ group or a monovalent hydrocarbon radical optionally containing heteroatoms and hydroxyl groups having from about 1 to about 40 carbon atoms, Z is O or CH$_2$ group subject to the limitation that the molecule contains even number of $O_{1/2}$ and even number of $(CH_2)_{1/2}$ groups and they both are all paired in the molecule, $R^3$ is a trivalent hydrocarbon radical optionally containing heteroatoms and hydroxyl groups having 1 to about 40 carbon atoms, $R^7$, $R^8$, $R^9$, $R^{19}$, $R^{11}$ and $R^{12}$ are each independently selected from the group of $OR^{14}$ or monovalent hydrocarbon radicals optionally containing heteroatoms and hydroxyl groups having 1 to about 20 carbon atoms, $R^4$ is a divalent, linear or branched unsaturated or saturated hydrocarbon radical containing at least one and less than about 30 carbon atoms and optionally containing heteroatoms and hydroxyl groups, $R^{13}$ is oxygen or divalent linear or branched unsaturated or saturated hydrocarbon radicals containing at least one and less than about 30 carbon atoms and optionally containing heteroatoms and hydroxyl groups, $R^{14}$ is a monovalent, linear or branched unsaturated or saturated hydrocarbon radical optionally containing heteroatoms and hydroxyl groups having 1 to about 20 carbon atoms, subscripts a, b, c, d and e are zero or positive subject to the limitation 3<a+b+c+d+e<about 1000, subscripts d+e>1, subscripts f, g, h, i and j are 0 or positive subject to the limitation f+g+h+i+j<about 300, and, subscript k is either 0 or 1.

DETAILED DESCRIPTION OF THE INVENTION

In the specification and claims herein, the following terms and expressions are to be understood as indicated.

The expression "hydrocarbon radicals" means any hydrocarbon group from which one or more hydrogen atoms have been removed and is inclusive of alkyl, alkenyl, alkynyl, cyclic alkyl, cyclic alkenyl, cyclic alkynyl, aryl, aralkyl and arenyl, and optionally it is substituted with oxygen, nitrogen, or sulfur.

The term "alkyl" means any monovalent, saturated, straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

Other optional ingredients may be added in the compositions of the present invention including coupling agents, e.g., silane coupling agents, curing aids, e.g., including activators, retarders and accelerators, processing additives such as oils, plasticizers, tackifying resins, silicas, other fillers, pigments, fatty acids, zinc oxide, waxes, antioxidants and antiozonants, peptizing agents, reinforcing materials such as, for example, carbon black; wetting agents, anticorrosion additives, hydrogen sulfide scavengers, biocides and so forth. Such additives are selected based upon the intended use and such selection is within the knowledge of one of skill in the art, as are the required amounts of such additives known to one of skill in the art.

In describing the products of the instant invention as a reaction product of initial materials reference is made to the initial species recited and it is to be noted that additional materials may be added to the initial mixture of synthetic precursors. These additional materials may be reactive or non-reactive. The defining characteristic of the instant invention is that the reaction product is obtained from the reaction of at least the components listed as disclosed. Non-reactive components may be added to the reaction mixture as diluents or to impart additional properties unrelated to the properties of the composition prepared as a reaction product. Thus for example finely divided solids such as pigments may be dispersed into the reaction mixture, before during or after reaction to produce a reaction product composition that additionally comprises the non-reactive component, e.g. a pigment. Additional reactive components may also be added; such components may react with the initial reactants or they may react with the reaction product; the phrase "reaction product" is intended to include those possibilities as well as including the addition of non-reactive components.

For the purpose of this disclosure, the term "immiscible" means that the two liquids have no or limited solubility in each other. Further, emulsions may also contain gases and solids. One of the immiscible liquids in an emulsion is generally polar, and often water based and the other liquid is generally non-polar, generally defined as an oil phase. The emulsion can be, for example, a water-in-oil, or an oil-in-water emulsion. In addition, it is also possible to prepare emulsions of emulsions and these are generally known as multiple emulsions, such as water-in-oil-in-water, oil-in-water-in-oil etc.

The emulsions of the present invention are those wherein the discontinuous (emulsified) component is in the form of droplets with droplet sizes in the range of about 0.1 microns up to about 500 microns and more, typically in the range of about 1 to about 100 microns. The emulsified component can be unstabilized, but is more typically stabilized by a stabilizing amount of a surfactant, a polymer and/or dispersed particulate solid.

The aqueous phase can be essentially pure water, or alternatively, water with varying amounts of solid (particulate) materials, minerals, salts or other chemicals.

The oil phase of the emulsion of the present invention is any hydrophobic phase substantially insoluble with the aqueous phase. For example, the oil phase can be composed of one or more hydrophobic chemicals, typically liquids, which individually or in combination are mainly insoluble in the aqueous phase. Such hydrophobic chemicals can be, for example, linear or branched, cyclic or acyclic, saturated or unsaturated, aliphatic or aromatic hydrocarbons. The hydrocarbons of the present invention typically contain at least about six carbon atoms and can be unsubstituted, or alternatively, substituted with one or more heteroatom-containing group (e.g., hydroxyl, amino, carboxyl, amide, anhydride, ester, or ether groups) as long as the hydrocarbons remain mainly insoluble with the aqueous phase.

Some examples of oil phases include, but are not limited to, halogenated or non-halogenated hydrocarbons having about 2 to about 30 carbons atoms, and more particularly, halogenated or non-halogenated ethenes, butadienes, pentanes, hexanes, heptanes, octanes, benzenes, toluene, ethylbenzenes, xylenes, naphthalene, cresols, naphtha, fats, lubrication oils, petroleum, gasoline, diesel fuel, crude oil, fuel oils, jet fuels, heating oils, cleaning oils, vegetable oils, mineral oils, crude oil, gas condensates and tar or bitumen derivatives.

According to the invention, a demulsifying composition is provided comprising a blend of a. an emulsion; and
b. a demulsifying-effective amount of a silicon containing co-polymer comprising at least one compound having the following molecular formula:

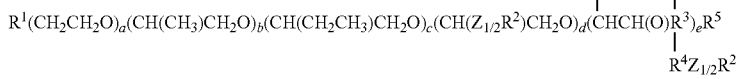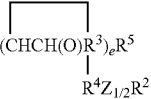

where $R^2$ is a group defined as
$M_fD_gT_hQ_iR^6_j$ with
$M=R^7R^8R^9SiZ_{1/2}$;
$D=R^{10}R^{11}SiZ_{2/2}$;
$T=R^{12}SiZ_{3/2}$;
$Q=SiZ_{4/2}$;
$R^6=-(CH_2)_{1/2}(R^{13})_k(CH_2)_{1/2}-$;
wherein
$R^1$ is independently selected from —OH or —OC(O)CH$_3$ or a monovalent hydrocarbon radical optionally containing heteroatoms and hydroxyl groups from about 1 to about 40 carbon atoms, preferably from about 1 to about 30 carbon atoms, and more preferably from about 1 to about 20 carbon atoms;

$R^5$ is independently selected from hydrogen or a —C(O)CH$_3$ group or a monovalent hydrocarbon radical optionally containing heteroatoms and hydroxyl groups from about 1 to about 40 carbon atoms, preferably from about 1 to about 30 carbon atoms, and more preferably from about 1 to about 20 carbon atoms;

Z is O or CH$_2$ group subject to the limitation that the molecule contains even number of $O_{1/2}$ and even number of $(CH_2)_{1/2}$ groups and they both are all paired in the molecule;

$R^3$ is a trivalent hydrocarbon radical optionally containing heteroatoms and hydroxyl groups with 1-40 carbon atoms, preferably from about 1 to about 30 carbon atoms, and more preferably from about 1 to about 20 carbon atoms;

$R^7$, $R^8$, $R^9$, $R^{10}$, $R^{11}$ and $R^{12}$ are each independently selected from the group of OR$^{14}$ or monovalent hydrocarbon radicals optionally containing heteroatoms and hydroxyl groups having from about 1 to about 20 carbon atoms, preferably from about 1 to about 15 carbon atoms and more preferably from about 1 to about 10 carbon atoms;

$R^4$ is a divalent, linear or branched unsaturated or saturated hydrocarbon radical containing at least one and less than about 30 carbon atoms and optionally containing heteroatoms and hydroxyl groups, $R^{13}$ is oxygen or divalent linear or branched unsaturated or saturated hydrocarbon radicals containing at least one and less than about 30 carbon atoms and optionally containing heteroatoms and hydroxyl groups, $R^{14}$ is a monovalent, linear or branched unsaturated or saturated hydrocarbon radical optionally containing heteroatoms and hydroxyl groups having from about 1 to about 20 carbon atoms, preferably from about 1 to about 15 carbon atoms and more preferably from about 1 to about 10 carbon atoms;

subscripts a, b, c, d and e are zero or positive subject to the limitation that 3<a+b+c+d+e<1000, preferably 3<a+b+c+d+e<750, and more preferably 3<a+b+c+d+e<500;
subscripts d+e>1;

subscripts f, g, h, i and j are 0 or positive subject to the limitation f+g+h+i+j<300, preferably f+g+h+i+j<200, more preferably f+g+h+i+j<100; and
subscript k is either 0 or 1.

Another aspect of the present invention is a silicon containing co-polymer composition (b) of the present invention comprising the compound having the following formula:

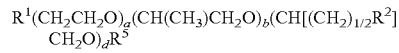

where $R^2$ is a group defined as

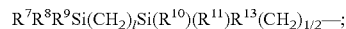

where
$1 \leq l < 1$.

Still another aspect of the present invention is a silicon containing co-polymer composition (b) of the present invention comprising the compound having the following formula:

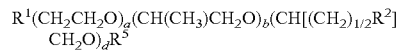

where
$R^2$ is a group defined as $M_fD_gT_hQ_iR^6_j$ with
$M=R^7R^8R^9Si(O)_{1/2}$;
$T=R^{12}Si(O)_{2/2}(CH_2)_{1/2}$;
$f=2$;
$g=0$;
$h=1$;
$i=0$;
$j=1$; and
$R^6=-(CH_2)_{1/2}R^{13}(CH_2)_{1/2}-$.

Still another aspect of the present invention is a silicon containing co-polymer composition (b) of the present invention comprising the compound having the following formula:

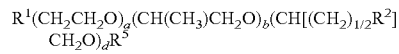

where $R^2$ is a group defined as
$R^7R^8R^9Si(CH_2)_lSi(R^{10})(R^{11})OSi(R^{10})(R^{11})R^{13}(CH_2)_{1/2}$; and
where $1 \leq l \leq 10$.

Still another aspect of the present invention is a silicon containing co-polymer composition (b) of the present invention comprising the compound having the following formula:

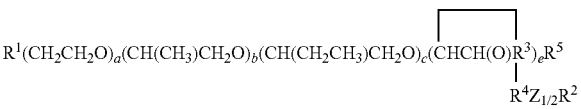

wherein
R² is a group defined as $M_f D_g T_h Q_i R^6_j$ with
$M=R^7R^8R^9Si(O)_{1/2}$;
$T=R^{12}Si(O)_{2/2}(CH_2)_{1/2}$;
f=2;
g=0;
h=1;
i=0;
j=1;
$R^6=-(CH_2)_{1/2}R^{13}(CH_2)_{1/2}-$;
$R^3=-CH_2CH_2CH[(CH_2)_{1/2}-]CH_2-$; and
$R^4=-(CH_2)_{1/2}R^{13}(CH_2)_{1/2}-$.

Applications for Embodiments of the Invention

Emulsions can create problems in many industrial applications because the emulsions often do not separate into the liquid components for a prolonged time. In this case typically chemical additives, so-called demulsifying agents, are added to initiate, accelerate and complete the separation process. Demulsifying agents break emulsions and mixtures of polar solutes like water, and non-polar solvents like oil.

Demulsifiers are used to separate emulsions into polar (typically water) and non-polar liquids by incorporating the demulsifying agent into the emulsion. Demulsifiers are known in the art and usually comprise blends of surface-active chemicals. Typical organic demulsifier structures include, but not limited to sulfonates, sulfosuccinates, polyol esters, polyester amines, polymeric elastomers, sulfated polyol ester, oxyalkylated phenolic resins, alkylphenol alkoxylates, amine alkoxylates, quaternary amines, ethoxylated amines, bisamides, polyalkylene glycols, polymerized polyols, resin esters, polyether polyols, resin alkoxylates, modified polyols, polyimine alkoxylates and diepoxides.

The compositions of the present invention may be utilized in mining and petroleum processing applications, especially for demulsification. Using the compositions of the present invention for demulsifying is accomplished by
i. incorporating a demulsifying-effective amount of at least one silicon containing co-polymer (b) of the present invention into an emulsion (a) including crude oil or the like;
ii. allowing the emulsion to separate into at least two phases; and
iii. separating said at least two phases from each other.

The compositions described in the present invention can be used for demulsifying alone or accompanied by additional silicone and/or organic demulsifiers and these components can be utilized in the form of a blend, a solution, a dispersion, or either an oil-in-water or a water-in-oil emulsion or microemulsion or the various demulsifying agents can be added separately. When applied in solution suitable solvents can be selected from linear or branched, cyclic or acyclic, saturated or unsaturated, aliphatic or aromatic hydrocarbons, alcohol, ketones, esters, ethers and their blends or whatever solvent is commonly used in the particular application.

When the organic and/or silicone demulsifier is included, the weight ratio of the compositions of the present invention to the organic and silicone demulsifier is typically in the range of about 100:1 to about 1:1000, more typically in the range of about 5:1 to about 1:200.

The method of separating emulsions comprises the incorporation of a demulsifying-effective amount of demulsifier into the emulsion, allowing the emulsion to separate into at least two phases and separating these at least two phases from each other. The incorporation of the demulsifier into the emulsion to be separated can be achieved by any method known in the art for integrally mixing the demulsifier with the emulsion. The mixing procedure can use, for example, standard mixers, high-speed mixers or blenders, or shakers. The temperature can be unadjusted within room temperature limits (~20-40° C.), or adjusted as required, for example, to 40-150° C. for a suitable amount of time.

A. Mining and Petroleum Industry

A typical application of the compositions in the present invention is the separation of crude oil emulsions. During extraction and production of crude oil, water or brine gets emulsified into the crude oil yielding a water-in-oil emulsion, which can be unstabilized or stabilized by surface active materials, organic solids, such as asphaltenes and resins, or inorganic solids. This water-in-oil emulsion gives rise to several down-stream problems; corrosion during refinery processes, disruption of distillation processes and greater energy requirement to pump the more viscous emulsion are to name a few. Thus, demulsifiers are extensively used in the petroleum industry to break water-in-oil and oil-in-water emulsions; and before transportation, refining or processing the water content of the crude oil has to be reduced to pipeline specification levels (typically less then 0.05-2%) and this is typically achieved by injecting demulsifiers into the well, into the crude oil stream, at the separation equipment or at any other suitable points.

The compositions of the present invention will cause improved demulsifying action in the Mining and Petroleum Industry, both in the oil field and refineries, including, but not limited to desalters; bitumen extraction from oils sands (separating bitumen froth and solvent diluted bitumen emulsions); in steam assisted gravity drainage (SAGD); in enhanced oil recovery with surfactants and/or polymers or using supercritical carbon dioxide; in the separation of waste oils, slop oils, sludges, such as oily waste from desalters, waste water skimmings, refinery and petrochemical plant waste (tank bottom washes, coker drum waste, "dirty bleeds" etc.), steel and aluminum industrial waste, including synthetic lubes, high lithium grease, lube oil from rollers, metalworking fluid waste and paper plant waste.

The compositions of the present invention can be also used for demulsification and antifoaming in gas/oil/water separators.

Dehazing (demulsification) of lubrication oils and lubrication oil waste, such as automotive waste (motor oil etc.), bunker oil are also possible applications of the compositions in the present invention.

The compositions of the present invention can be also applied in emulsion preventors ("non-emulsifiers") in drilling and well completion operations.

Another typical industrial use of the reaction products in the present invention is diesel fuel (including bio-diesel) dehazing when the demulsifier eliminates small amount of emulsified water from the diesel fuel and diesel fuel antifoaming.

The compositions of the present invention will improve ore recovery from mining operations. The inclusion of the present compositions to mining processes such as flocculation, separation, purification, concentration, leaching & chemical extraction improves the separation of minerals from their gangue.

Further applications of the present invention in oil and gas include asphaltene dispersants and drag reduction.

B. Water Processing

Compositions of the present invention are useful for applications involving commercial and industrial open recirculating cooling water towers, closed cooling water systems, cooling water conduits, heat exchangers, condensers, oncethrough cooling systems, Pasteurizers, air washers, heat exchange systems, air conditioning/humidifiers/dehumidifiers, hydrostatic cookers, safety and/or fire water protection storage systems, water scrubbers, disposal wells, influent water systems, including filtration and clarifiers, wastewater treatment, wastewater treatment tanks, conduits, filtration beds, digesters, clarifiers, holding ponds, settling lagoons, canals, odor control, ion exchange resin beds, membrane filtration, reverse osmosis, micro- and ultra-filtration, assisting in the removal of biofilms in cooling tower applications, heat exchangers and process water systems, and the like.

EXAMPLES

Preparation of Example 1

A polyether with the average structure:

$$HO(CH_2CH_2O)_{31}(CH_2CH(CH_2OCH_2CHCH_2)O)_{2.8}H$$
(250 g)

was combined with 1,1,1,3,5,5,5-heptamethyltrisiloxane (86.64 g) and sodium propionate (0.1 g) in a 500 mL round bottom flask. The flask was equipped with an overhead stirrer, heating mantle, reflux condenser, and a temperature controller. The flask was heated to 75° C. and Karstedt's catalyst was added (10 ppm based on Pt). The temperature began to rise due to the exotherm and peaked at 99° C. at 30 minutes. The reaction was held at 85° C. for an additional 1 hour. The reaction was determined to be complete by placing a sample in a digestion tube with a base. The absence of hydrogen evolution indicates complete consumption of Si—H groups. The product was transferred to a rotary evaporator and stripped at 120° C. with a nitrogen sparge at 50 mm Hg for 1 hour. Celite 545 (5 g) was added and the product was pressure filtered through a 5-micron pressure filter. The resulting product was an opaque yellow wax at room temperature.

Preparation of Example 2

A polyether with the average structure

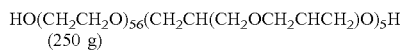
$$HO(CH_2CH_2O)_{56}(CH_2CH(CH_2OCH_2CHCH_2)O)_5H$$
(250 g)

was combined with 1,1,1,3,5,5,5-heptamethyltrisiloxane (86.64 g), isopropanol (200 g) and sodium propionate (0.1 g) in a 500 mL round bottom flask. The flask was equipped with an overhead stirrer, heating mantle, reflux condenser, and a temperature controller. The flask was heated to 75° C. and Karstedt's catalyst was added (10 ppm based on Pt). The temperature began to rise due to the exotherm and peaked at 86° C. at 15 minutes and began to reflux. The reaction was held at 85° C. for an additional 1 hour. 1 cc/g of Si—H was found so an additional Karstedt's catalyst (5 ppm) was added. After an additional hour the reaction was determined to be complete. The product was transferred to a rotary evaporator and stripped at 120° C. with a nitrogen sparge at 20 mm Hg for 1 hour. Celite 545 (5 g) was added and the product was pressure filtered through a 5-micron pressure filter. The resulting product was an opaque yellow wax at room temperature.

Preparation of Example 3

A polyether with the average structure

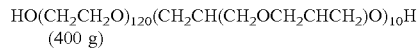
$$HO(CH_2CH_2O)_{120}(CH_2CH(CH_2OCH_2CHCH_2)O)_{10}H$$
(400 g)

was combined with 1,1,1,3,5,5,5-heptamethyltrisiloxane (129.88 g), isopropanol (132.33 g) and sodium propionate (0.1 g) in a 500 mL round bottom flask. The flask was equipped with an overhead stirrer, heating mantle, reflux condenser, and a temperature controller. The flask was heated to 80° C. and Karstedt's catalyst was added (10 ppm based on Pt). The temperature began to rise due to the exotherm and peaked at 85° C. at 15 minutes and began to reflux. The reaction was held at 80° C. for an additional 24 hours. The reaction was determined to be complete. The product was transferred to a rotary evaporator and stripped at 90° C. with a nitrogen sparge at 20 mm Hg for 3 hour. Celite 545 (5 g) was added and the product was pressure filtered through a 5-micron pressure filter. The resulting product was an opaque yellow wax at room temperature.

Preparation of Example 4

A polyether with the average structure

$$HO(CH_2CH_2O)_{31}(CH_2CH(CH_2OCH_2CHCH_2)O)_{2.8}H$$
(60.19 g)

was combined with 1-trimethylsilyl-2-dimethylsilylethane (16.04 g) in a 250 mL round bottom flask. The flask was equipped with an overhead stirrer, heating mantle, reflux condenser, and a temperature controller. The flask was heated to 85° C. and Karstedt's catalyst was added (10 ppm based on Pt). The temperature began to rise due to the exotherm and peaked at 99° C. at 10 minutes accompanied by a strong reflux. The reaction was held at 85° C. for an additional 2 hour. The reaction was determined to be complete by infrared spectroscopy. The product was transferred to a rotary evaporator and stripped at 90° C. at 50 mm Hg for 1 hour. The resulting product was an opaque yellow wax at room temperature.

Preparation of Example 5

A polyether with the average structure

$$HO(CH_2CH_2O)_{31}(CH_2CH(CH_2OCH_2CHCH_2)O)_{2.8}H$$
(60.19 g)

was combined with 1-(2-dimethylsilanyl-ethyl)-1,1,3,3,3-pentamethyl-disiloxane (23.46 g) and of isopropanol (16.23 g) in a 250 mL round bottom flask. The flask was equipped with an overhead stirrer, heating mantle, reflux condenser, and a temperature controller. The flask was heated to 85° C. and Karstedt's catalyst was added (10 ppm based on Pt). The temperature began to rise due to the exotherm and peaked at 99.9° C. at 10 minutes accompanied by a strong reflux. The reaction was held at 85° C. for an additional 2 hour. The reaction was determined to be complete by infrared spectroscopy. The product was transferred to a rotary evaporator and stripped at 90° C. at 50 mm Hg for 1 hour. The resulting product was an opaque yellow wax at room temperature.

Preparation of Example 6

A polyether with the average structure $$HO(CH_2CH_2O)_{31}(CH_2CH(CH_2OCH_2CHCH_2)O)_{2.8}H$$
(252.75 g)

was combined with di-t-butoxymethylsilane (79.95 g) and of isopropanol (66.54 g) in a 500 mL round bottom flask. The flask was equipped with an overhead stirrer, heating mantle, reflux condenser, and a temperature controller. The flask was heated to 85° C. and Karstedt's catalyst was added (10 ppm based on Pt). The temperature began to rise due to the exotherm and peaked at 90° C. at 10 minutes accompanied by a strong reflux. The reaction was held at 85° C. overnight. The reaction was determined to be complete by infrared spectroscopy. The product was transferred to a rotary evaporator and stripped at 90° C. at 50 mm Hg for 1 hour. The resulting product was an opaque yellow wax at room temperature.

TESTING EXAMPLES

The following testing examples illustrate the use of copolymers in the present invention as demulsifying agents.

Testing Method

Crude oil demulsifiers were tested in the Middle East with fresh crude oil samples from three different oil fields. Field 1 produced heavy crude oil with about 15°API, Field 2 produced a medium crude oil with about 25°API and Field 3 produced heavy crude oil with about 18-19°API.

The following test method was used to evaluate demulsifiers:

First the water cut was determined by blending 50 part (vol.) of crude oil with 50 parts (vol.) of xylenes and with a highly efficient demulsifier in sufficient dose to completely separate the water from the crude. Then this blend was centrifuged for 5 min and the water cut was determined.

Crude oil emulsions were tested near the wells, making sure that the samples were not older than 1-2 days. After homogenizing the sample by hand shaking, one hundred ml of crude oil emulsion was carefully poured into prescription glass bottles, which had marks at 10 ml intervals.

The various demulsifiers were added and the bottles were hand shaken 100 times and then the samples were kept in a water bath at the required temperature for a period of time characteristic of the separators at the field. The amount of the separated water was determined at regular intervals. At the end of the separation process the bottles were removed from the bath and the appearance of the separated crude oil, the separated water phase and crude oil/water interface, respectively, were observed. Then a sample was taken from the top 80% of the separated crude oil phase and the residual water content of this top cut was determined in two steps. First 50 parts (vol.) of crude oil sample was blended with 50 parts (vol.) of xylenes in a centrifuge tube (about 12.5 ml). Then this blend was vigorously shaken by hand and centrifuged for 5 min and the amount of separated water ("free water", W1) was recorded. Then two drops of a highly efficient demulsifier (knockout dropper) was added, followed by vigorous shaking and centrifuged again, to determine the total water (W2) content. The difference between the total and free water content is the unresolved emulsion ($\Delta W$) and it characterized the efficiency of a demulsifier. The mixed cut was analyzed after the separation, by carefully siphoning out the separated water phase from the bottom of the and then homogenizing the sample by hand-shaking. A sample from the homogenized crude was then analyzed by centrifugation as above.

Organic Demulsifiers:

Org 1, Org 2, Org 3, Org 4, Org 5 and Org 6 are designations for fully formulated organic demulsifier packages, which were developed for Field 1, Field 2 and Field 3 or typically used there.

Testing Example 1

Separation of Crude Oil Emulsion from Field 1

The original crude oil emulsion sample contained 24% free water and 38% total water. Table 1 shows the results at 40° C. using organic formulations with and without the silicone example, respectively. When the silicone was also added the organic demulsifier dose was halved.

TABLE 1

Bottle tests with crude oil emulsion from Field 1, at 40° C.

| # | Demulsifier | Dose ppm | WATER DROP 60 min | 120 | 22 | TOP CUT (80%) W1 | W2 | $\Delta W$ | MIXED CUT W1 | W2 | $\Delta W$ |
|---|---|---|---|---|---|---|---|---|---|---|---|
| 1 | Org 1 | 100 | 4 | 13 | 21 | 7.0 | 19 | 12.0 | 7 | 19 | 12 |
| 2 | Org 1 + Ex. 2 | 50 + 2 | 5 | 17 | 25 | 6.0 | 14 | 8.0 | 11 | 18 | 7 |
| 3 | Org 2 | 100 | 3 | 9 | 19 | 1.0 | 13 | 12.0 | 1.6 | 22 | 20.4 |
| 4 | Org 2 + Ex. 2 | 50 + 2 | 3 | 19 | 22 | 9.0 | 16 | 7.0 | 13 | 18 | 5 |
| 5 | Org 3 | 100 | 8 | 11 | 17 | 1.0 | 16 | 15.0 | 9 | 23 | 14 |
| 6 | Org 3 + Ex. 2 | 50 + 2 | 5 | 13 | 21 | 8.0 | 14 | 6.0 | 11 | 18 | 7 |
| 7 | Org 4 | 100 | 5 | 16 | 28 | 2.0 | 15 | 13.0 | 5.2 | 18 | 12.6 |
| 8 | Org 4 + Ex. 2 | 50 + 2 | 5 | 13 | 25 | 7.0 | 14 | 7.0 | 9 | 17 | 8 |
| 9 | BLANK | 0 | 0 | 0 | 5 | | | | | | |

Testing Example 2

Separation of Crude Oil Emulsion from Field 1

The original crude oil emulsion sample contained 13% free water and 32% total water. Table 2 shows the results at 60° C. using organic formulations with and without the silicone example, respectively. When the silicone was also added the organic demulsifier dose was halved.

TABLE 2

Bottle tests with crude oil emulsion from Field 1, at 60° C.

| # | Demulsifier | Dose ppm | WATER DROP 30 min | WATER DROP 19 h | TOP CUT (80%) W1 | TOP CUT (80%) W2 | TOP CUT (80%) Δ W | MIXED CUT W1 | MIXED CUT W2 | MIXED CUT Δ W |
|---|---|---|---|---|---|---|---|---|---|---|
| 1 | Org 5 | 70 | 1 | 16 | 1.8 | 4 | 2.2 | 2.2 | 4.8 | 2.6 |
| 2 | Org 5 + Ex. 2 | 35 + 1.25 | 1 | 18 | 2.0 | 5.6 | 2.4 | 3.6 | 7 | 4.6 |
| 3 | Org 3 | 70 | 2 | 14 | 0.0 | 9.5 | 9.5 | 2.8 | 9.5 | 6.7 |
| 4 | Org 3 + Ex. 2 | 35 + 1.25 | 2 | 15 | 4.8 | 10 | 5.2 | 8 | 12 | 4 |
| 5 | Org 4 | 70 | tr | 13 | 1.6 | 9 | 7.4 | 7 | 12 | 6 |
| 6 | Org 4 + Ex. 2 | 35 + 1.25 | 2 | 16 | 2.8 | 10 | 7.2 | 5.8 | 9 | 3.2 | tr: trace

Testing Example 3

Separation of Crude Oil Emulsion from Field 1

The original crude oil emulsion sample contained 13% free water and 32% total water. Table 3 shows the results at 60° C. using organic formulations with and without the silicone example, respectively. When the silicone was also added the organic demulsifier dose was significantly reduced.

TABLE 3

Bottle tests with crude oil emulsion from Field 1, at 60° C.

| # | Demulsifier | Dose ppm | WATER DROP 20 min | WATER DROP 60 min | WATER DROP 3 hours | WATER DROP 20 | TOP CUT (80%) W1 | TOP CUT (80%) W2 | TOP CUT (80%) Δ W | MIXED CUT W1 | MIXED CUT W2 | MIXED CUT Δ W |
|---|---|---|---|---|---|---|---|---|---|---|---|---|
| 1 | Org 3 | 50 | tr | 13 | 19 | 27 | 0.0 | 10 | 10.0 | 1.2 | 4.4 | 3.2 |
| 2 | Org 3 | 100 | 12 | 20 | 22 | 36 | 0.8 | 2 | 1.2 | 2.4 | 4 | 1.6 |
| 3 | Org 3 + Ex. 2 | 50 + 1 | 7 | 20 | 21 | 33 | 1.2 | 5.2 | 4.0 | 3.2 | 6 | 2.8 |
| 4 | Org 3 + Ex. 2 | 50 + 2 | 4 | 22 | 22 | 30 | 4.0 | 8 | 4.0 | 6 | 9 | 3 |
| 5 | Org 3 + Ex. 2 | 60 + 3 | 13 | 23 | 24 | 32 | 4.4 | 8 | 3.6 | 6 | 8 | 2 |
| 6 | Org 3 + Ex. 2 | 70 + 3.5 | 10 | 21 | 23 | 30 | 4.4 | 7 | 2.6 | 5.2 | 7 | 1.8 |
| 7 | Org 3 + Ex. 2 | 50 + 1 | 2 | 22 | 23 | 35 | 0.4 | 3.2 | 2.8 | 2.4 | 4.8 | 2.4 |
| 8 | Org 3 + Ex. 2 | 50 + 2 | 10 | 23 | 26 | 32 | 2.0 | 4.4 | 2.4 | 3.2 | 5.2 | 2 |
| 9 | Org 1 | 50 | 2 | 15 | 20 | 27 | 0.8 | 12 | 11.2 | 2 | 14 | 12 |
| 10 | Org 1 | 100 | 5 | 21 | 25 | 33 | 0.4 | 4.8 | 4.4 | 1.2 | 5.6 | 4.4 |
| 11 | Org 6 | 50 | 1 | 16 | 20 | 22 | 0.0 | 13 | 13.0 | 2.4 | 13 | 10.6 |
| 12 | Org 6 | 100 | 12 | 23 | 25 | 32 | 0.0 | 3.2 | 3.2 | 2.4 | 12 | 9.6 |
| 13 | Org 2 | 50 | 2 | 10 | 16 | 28 | 0.0 | 8 | 8.0 | 0.6 | 11 | 10.4 |
| 14 | Org 2 | 100 | 9 | 21 | 25 | 32 | 2.0 | 3.6 | 1.6 | 2.8 | 6 | 3.2 | tr: trace

Testing Example 4

Separation of Crude Oil Emulsion from Field 1

The original crude oil emulsion sample contained 13% free water and 32% total water. Table 4 shows the results at 40° C. using organic formulations with and without the silicone example, respectively. When the silicone was also added the organic demulsifier dose was significantly reduced.

TABLE 4

Bottle tests with crude oil emulsion from Field 1, at 40° C.

| # | Demulsifier | Dose ppm | WATER DROP 120 min | WATER DROP 150 min | WATER DROP 20 h | TOP CUT (80%) W1 | TOP CUT (80%) W2 | TOP CUT (80%) Δ W | MIXED CUT W1 | MIXED CUT W2 | MIXED CUT Δ W |
|---|---|---|---|---|---|---|---|---|---|---|---|
| 1 | Org 3 | 50 | tr | 9 | 18 | 4.0 | 21 | 17.0 | 7 | 23 | 16 |
| 2 | Org 3 | 100 | 6 | 11 | 22 | 6.0 | 22 | 14.0 | 10 | 22 | 12 |
| 3 | Org 3 + Ex. 2 | 50 + 1 | 4 | 11 | 23 | 8.0 | 15 | 7.0 | 10 | 17 | 7 |
| 4 | Org 3 + Ex. 2 | 50 + 2 | 5 | 14 | 30 | 7.0 | 13 | 6.0 | 10 | 13 | 3 |

TABLE 4-continued

Bottle tests with crude oil emulsion from Field 1, at 40° C.

| # | Demulsifier | Dose ppm | WATER DROP 120 min | WATER DROP 150 min | WATER DROP 20 h | TOP CUT (80%) W1 | TOP CUT (80%) W2 | TOP CUT (80%) Δ W | MIXED CUT W1 | MIXED CUT W2 | MIXED CUT Δ W |
|---|---|---|---|---|---|---|---|---|---|---|---|
| 5 | Org 3 + Ex. 2 | 60 + 3 | 5 | 15 | 28 | 7.0 | 13 | 6.0 | 11 | 15 | 4 |
| 6 | Org 3 + Ex. 2 | 70 + 3.5 | 5 | 16 | 29 | 7.0 | 12 | 5.0 | 11 | 12 | 1 |
| 7 | Org 3 + Ex. 1 | 50 + 1 | 5 | 11 | 25 | 8.0 | 16 | 8.0 | 7 | 15 | 8 |
| 8 | Org 3 + Ex. 1 | 50 + 2 | 1 | 6 | 27 | 8.0 | 14 | 6.0 | 8 | 12 | 4 |
| 9 | Org 1 | 50 | 3 | 5 | 18 | 7.0 | 23 | 16.0 | 9 | 26 | 17 |
| 10 | Org 1 | 100 | 3 | 8 | 21 | 2.8 | 14 | 0.5 | 3.2 | 16 | 12.8 |
| 11 | Org 6 | 50 | 1 | 4 | 15 | 5.2 | 22 | 16.8 | 10 | 26 | 16 |
| 12 | Org 6 | 100 | 8 | 12 | 19 | 4.0 | 19 | 15.0 | 11 | 23 | 12 |
| 13 | Org 2 | 50 | tr | 1 | 18 | 1.8 | 22 | 20.2 | 10 | 24 | 14 |
| 14 | Org 2 | 100 | 5 | 10 | 23 | 1.6 | 15 | 13.4 | 10 | 16 | 6 | tr: trace

Testing Example 5

Separation of Crude Oil Emulsion from Field 1

The original crude oil emulsion sample contained 18% free water and 28% total water. Table 5 shows the results at 60° C. using organic formulations with and without the silicone example, respectively. When the silicone was also added the organic demulsifier dose was halved.

TABLE 5

Bottle tests with crude oil emulsion from Field 1, at 60° C.

| # | Demulsifier | Dose ppm | WATER DROP 17 hours | TOP CUT (80%) W1 | TOP CUT (80%) W2 | TOP CUT (80%) Δ W | MIXED CUT W1 | MIXED CUT W2 | MIXED CUT Δ W |
|---|---|---|---|---|---|---|---|---|---|
| 1 | Org 6 | 100 | 19 | 0.8 | 12 | 11.2 | 4.4 | 14 | 9.6 |
| 2 | Org 6 + Ex. 2 | 50 + 2 | 19 | 8.0 | 14 | 6.0 | 9 | 15 | 6 |
| 3 | Org 1 | 100 | 15 | 2.0 | 14 | 12.0 | 2 | 14 | 12 |
| 4 | Org 1 + Ex. 2 | 50 + 2 | 18 | 1.2 | 14 | 12.8 | 6 | 14 | 8 |

Testing Example 6

Separation of Crude Oil Emulsion from Field 2

The original crude oil emulsion sample contained 32% free water and 48% total water. Table 6 shows the results at 40° C. using organic formulations with and without the silicone example, respectively. When the silicone was also added the organic demulsifier dose was halved.

TABLE 6

Bottle tests with crude oil emulsion from Field 2, at 40° C.

| # | Demulsifier | Dose ppm | WATER DROP 10 min | WATER DROP 20 min | WATER DROP 60 min | WATER DROP 90 min | TOP CUT (80%) W1 | TOP CUT (80%) W2 | TOP CUT (80%) Δ W | MIXED CUT W1 | MIXED CUT W2 | MIXED CUT Δ W |
|---|---|---|---|---|---|---|---|---|---|---|---|---|
| 1 | Org 1 | 100 | 6 | 20 | 29 | 30 | 3.2 | 11 | 7.8 | 0.8 | 14 | 13.2 |
| 2 | Org 2 | 100 | 2 | 7 | 10 | 15 | 4.0 | 11 | 7.0 | 4.8 | 15 | 10.2 |
| 3 | Org 3 | 100 | 6 | 19 | 30 | 32 | 6.0 | 9 | 3.0 | 7 | 12 | 5 |
| 4 | Org 4 | 100 | 5 | 28 | 30 | 32 | 2.4 | 9 | 6.6 | 0.8 | 10 | 9.2 |
| 5 | Org 1 + Ex. 2 | 50 + 2 | 2 | 19 | 29 | 31 | 10.0 | 15 | 5.0 | 9 | 14 | 5 |
| 6 | Org 2 + Ex. 2 | 50 + 2 | 3 | 20 | 28 | 31 | 12.0 | 13 | 1.0 | 11 | 12 | 1 |
| 7 | Org 3 + Ex. 2 | 50 + 2 | 2 | 18 | 29 | 30 | 9.0 | 11 | 2.0 | 8 | 11 | 3 |
| 8 | Org 4 + Ex. 2 | 50 + 2 | 2 | 11 | 21 | 29 | 10.0 | 13 | 3.0 | 11 | 14 | 3 |
| 11 | BLANK | 0 | tr | tr | tr | | | | | | | | tr: trace

Testing Example 7

Separation of Crude Oil Emulsion from Field 2

The original crude oil emulsion sample contained 50% free water and 60% total water. Table 7 shows the results at 40° C. using organic formulations with and without the silicone example, respectively. When the silicone was also added the organic demulsifier dose was halved.

TABLE 7

| | | | \multicolumn{4}{c}{Bottle tests with crude oil emulsion from Field 2, at 40° C.} | | | | | | |
|---|---|---|---|---|---|---|---|---|---|---|---|---|
| | | Dose | \multicolumn{4}{c}{WATER DROP} | \multicolumn{3}{c}{TOP CUT (80%)} | \multicolumn{3}{c}{MIXED CUT} | |
| # | Demulsifier | ppm | 10 min | 20 min | 30 min | 60 min | W1 | W2 | Δ W | W1 | W2 | Δ W |
| 1 | Org 1 | 100 | 15 | 42 | 45 | 45 | 2.8 | 8 | 5.2 | 1.6 | 7 | 5.4 |
| 2 | Org 1 + Ex. 2 | 50 + 2 | 15 | 40 | 45 | 47 | 5.2 | 9 | 3.8 | 6 | 9 | 3 |
| 3 | Org 2 | 100 | 8 | 11 | 13 | 21 | 1.6 | 6 | 4.4 | 0.4 | 4.4 | 4 |
| 4 | Org 2 + Ex. 2 | 50 + 2 | 11 | 41 | 50 | 52 | 7.0 | 7 | 0.0 | 7 | 8 | 1 |
| 5 | Org 3 | 100 | 40 | 50 | 53 | 54 | 3.8 | 6 | 3.2 | 2.4 | 5.2 | 2.8 |
| 6 | Org 3 + Ex. 2 | 50 + 2 | 25 | 50 | 57 | 56 | 4.0 | 6 | 2.0 | 4.4 | 6 | 1.6 |
| 7 | Org 4 | 100 | 45 | 55 | 57 | 57 | 0.0 | 4 | 4.0 | 1.6 | 4 | 2.4 |
| 8 | Org 4 + Ex. 2 | 50 + 2 | 21 | 50 | 55 | 55 | 4.0 | 7 | 3.0 | 4 | 7 | 3 |
| 10 | BLANK | 0 | 0 | 0 | 0 | 0 | | | | | | |

Testing Example 8

Separation of Crude Oil Emulsion from Field 2

The original crude oil emulsion sample contained 40% free water and 48% total water. Table 8 shows the results at 60° C. using organic formulations with and without the silicone example, respectively. When the silicone was also added the organic demulsifier dose was halved.

TABLE 8

| | | | \multicolumn{4}{c}{Bottle tests with crude oil emulsion from Field 2, at 60° C.} | | | | | | |
|---|---|---|---|---|---|---|---|---|---|---|---|---|
| | | Dose | \multicolumn{4}{c}{WATER DROP} | \multicolumn{3}{c}{TOP CUT (80%)} | \multicolumn{3}{c}{MIXED CUT} | |
| # | Demulsifier | ppm | 5 min | 10 min | 30 min | 60 min | W1 | W2 | Δ W | W1 | W2 | Δ W |
| 1 | Org 5 | 50 | 12 | 22 | 30 | 34 | 2.8 | 15 | 12.2 | 4.8 | 18 | 13.2 |
| 2 | Org 5 + Ex. 2 | 25 + 1 | 18 | 25 | 30 | 32 | 10.0 | 20 | 10.0 | 10 | 20 | 10 |
| 3 | Org 3 | 50 | 15 | 21 | 29 | 33 | 1.6 | 12 | 10.4 | 3.2 | 13 | 9.8 |
| 4 | Org 3 + Ex. 2 | 25 + 1 | 25 | 28 | 31 | 35 | 9.0 | 15 | 6.0 | 7 | 14 | 7 |
| 5 | Org 4 | 50 | 20 | 31 | 34 | 37 | 0.8 | 11 | 10.2 | 2 | 11 | 9 |
| 6 | Org 4 + Ex. 2 | 25 + 1 | 25 | 33 | 36 | 38 | 9.0 | 13 | 4.0 | 8 | 16 | 8 |

Testing Example 9

Separation of Crude Oil Emulsion from Field 2

The original crude oil emulsion sample contained 20% free water and 40% total water. Table 9 shows the results at 40° C. using organic formulations with and without the silicone example, respectively. When the silicone was also added the organic demulsifier dose was halved.

TABLE 9

| | | | \multicolumn{4}{c}{Bottle tests with crude oil emulsion from Field 2, at 40° C.} | | | | | | |
|---|---|---|---|---|---|---|---|---|---|---|---|---|
| | | Dose | \multicolumn{4}{c}{WATER DROP} | \multicolumn{3}{c}{TOP CUT (80%)} | \multicolumn{3}{c}{MIXED CUT} | |
| # | Demulsifier | ppm | 5 min | 10 min | 15 min | 40 min | 60 min | W1 | W2 | Δ W | W1 | W2 | Δ W |
| 1 | Org 6 | 100 | tr | 1 | 5 | 32 | 35 | 0.0 | 2.4 | 2.4 | 0 | 3 | 3 |
| 2 | Org 6 + Ex. 2 | 50 + 2 | 3 | 7 | 25 | 36 | 37 | 4.8 | 6 | 1.2 | 4 | 5 | 1 |

TABLE 9-continued

Bottle tests with crude oil emulsion from Field 2, at 40° C.

| # | Demulsifier | Dose ppm | WATER DROP 5 min | 10 min | 15 min | 40 min | 60 min | TOP CUT (80%) W1 | W2 | Δ W | MIXED CUT W1 | W2 | Δ W |
|---|---|---|---|---|---|---|---|---|---|---|---|---|---|
| 3 | Org 1 | 100 | 13 | 30 | 34 | 37 | 38 | 0.0 | 2.4 | 2.4 | 0.2 | 4 | 3.8 |
| 4 | Org 1 + Ex. 2 | 50 + 2 | 3 | 11 | 31 | 36 | 35 | 4.0 | 8 | 4.0 | 3.2 | 8 | 4.6 | tr: trace

Testing Example 10

Separation of Crude Oil Emulsion from Field 2

The original crude oil emulsion sample contained 20% free water and 40% total water. Table 10 shows the results at 60° C. using organic formulations with and without the silicone example, respectively. When the silicone was also added the organic demulsifier dose was halved.

TABLE 10

Bottle tests with crude oil emulsion from Field 2, at 60° C.

| # | Demulsifier | Dose ppm | WATER DROP 5 min | 10 min | 60 min | TOP CUT (80%) W1 | W2 | Δ W | MIXED CUT W1 | W2 | Δ W |
|---|---|---|---|---|---|---|---|---|---|---|---|
| 1 | Org 6 | 100 | tr | 2 | 35 | 1.6 | 5.6 | 4.0 | 1.6 | 6 | 4.4 |
| 2 | Org 6 + Ex. 2 | 50 + 2 | 16 | 30 | 39 | 8.5 | 10 | 1.5 | 7 | 8 | 1 |
| 3 | Org 1 | 100 | 36 | 36 | 38 | 0.6 | 7 | 6.4 | 0.2 | 8 | 7.8 |
| 4 | Org 1 + Ex. 2 | 50 + 2 | 36 | 36 | 37 | 8.0 | 12 | 4.0 | 9 | 14 | 5 |

Testing Example 11

Separation of Crude Oil Emulsion from Field 3

The original crude oil emulsion sample contained 14% free water and 28% total water. Table 11 shows the results at 40° C. using organic formulations with and without the silicone example, respectively. When the silicone was also added the organic demulsifier dose was halved.

TABLE 11

Bottle tests with crude oil emulsion from Field 3, at 40° C.

| # | Demulsifier | Dose ppm | WATER DROP 2 hours | 22 hours | TOP CUT (80%) W1 | W2 | Δ W | MIXED CUT W1 | W2 | Δ W |
|---|---|---|---|---|---|---|---|---|---|---|
| 1 | Org 1 | 100 | 2 | 19 | 4.8 | 10 | 5.2 | 7 | 11 | 4 |
| 2 | Org 1 + Ex. 2 | 50 + 2 | 2 | 19 | 8.0 | 13 | 5.0 | 7.5 | 12 | 4.5 |
| 3 | Org 2 | 100 | 4 | 20 | 2.8 | 6 | 3.2 | 4 | 8 | 4 |
| 4 | Org 2 + Ex. 2 | 50 + 2 | 1 | 19 | 7.0 | 9 | 2.0 | 8 | 10 | 2 |
| 5 | Org 3 | 100 | 3 | 20 | 2.4 | 9 | 6.6 | 4.4 | 10 | 5.6 |
| 6 | Org 3 + Ex. 2 | 50 + 2 | 3 | 19 | 7.0 | 12 | 5.0 | 7 | 11 | 4 |
| 7 | Org 4 | 100 | 2 | 21 | 2.8 | 9 | 6.2 | 4.8 | 8 | 3.2 |
| 8 | Org 4 + Ex. 2 | 50 + 2 | 2 | 22 | 3.2 | 8 | 4.4 | 5.2 | 8 | 2.8 |
| 10 | BLANK | 0 | 0 | 0 | | | | | | |

Testing Example 12

Separation of Crude Oil Emulsion from Field 3

The original crude oil emulsion sample contained 8% free water and 20% total water. Table 12 shows the results at 60° C. using organic formulations with and without the silicone example, respectively. When the silicone was also added the organic demulsifier dose was halved.

TABLE 12

Bottle tests with crude oil emulsion from Field 2, at 60° C.

| # | Demulsifier | Dose ppm | WATER DROP 30 min | 19 h | TOP CUT (80%) W1 | W2 | Δ W | MIXED CUT W1 | W2 | Δ W |
|---|---|---|---|---|---|---|---|---|---|---|
| 1 | Org 5 | 70 | 1 | 16 | 1.8 | 4 | 2.2 | 2.2 | 4.8 | 2.6 |
| 2 | Org 5 + Ex. 2 | 35 + 1.25 | 1 | 18 | 2.0 | 5.6 | 2.4 | 3.6 | 7 | 4.6 |
| 3 | Org 3 | 70 | 2 | 14 | 0.0 | 9.5 | 9.5 | 2.8 | 9.5 | 6.7 |
| 4 | Org 3 + Ex. 2 | 35 + 1.25 | 2 | 15 | 4.8 | 10 | 5.2 | 8 | 12 | 4 |
| 5 | Org 4 | 70 | tr | 13 | 1.6 | 9 | 7.4 | 7 | 12 | 5 |
| 6 | Org 4 + Ex. 2 | 35 + 1.25 | 2 | 16 | 2.8 | 10 | 7.2 | 5.8 | 9 | 3.2 | tr: trace

Testing Example 13

Separation of Crude Oil Emulsion from Field 3

The original crude oil emulsion sample contained 13% free water and 26% total water. Table 13 shows the results at 40° C. using organic formulations with and without the silicone example, respectively. When the silicone was also added the organic demulsifier dose was halved.

TABLE 13

Bottle tests with crude oil emulsion from Field 2, at 40° C.

| # | Demulsifier | Dose ppm | WATER DROP 17 hours | TOP CUT (80%) W1 | W2 | Δ W | MIXED CUT W1 | W2 | Δ W |
|---|---|---|---|---|---|---|---|---|---|
| 1 | Org 6 | 100 | 10 | 7.0 | 12 | 5.0 | 6 | 13 | 7 |
| 2 | Org 6 + Ex. 2 | 50 + 2 | 11 | 8.0 | 17 | 9.0 | 11 | 17 | 6 |
| 3 | Org 1 | 100 | 14 | 5.2 | 11 | 5.8 | 3.8 | 13 | 9.2 |
| 4 | Org 1 + Ex. 2 | 50 + 2 | 12 | 7.0 | 13 | 6.0 | 9 | 15 | 6 |

Testing Example 14

Separation of Crude Oil Emulsion from Field 3

The original crude oil emulsion sample contained 13% free water and 26% total water. Table 14 shows the results at 60° C. using organic formulations with and without the silicone example, respectively. When the silicone was also added the organic demulsifier dose was halved.

TABLE 14

Bottle tests with crude oil emulsion from Field 3, at 60° C.

| # | Demulsifier | Dose ppm | WATER DROP 17 hours | TOP CUT (80%) W1 | W2 | Δ W | MIXED CUT W1 | W2 | Δ W |
|---|---|---|---|---|---|---|---|---|---|
| 1 | Org 6 | 70 | 9 | 8.0 | 16 | 8.0 | 7 | 13 | 6 |
| 2 | Org 6 + Ex. 2 | 35 + 1.25 | 9 | 9.0 | 18 | 9.0 | 8.5 | 15 | 6.5 |
| 3 | Org 1 | 70 | 11 | 7.0 | 14 | 7.0 | 9 | 14 | 5 |
| 4 | Org 1 + Ex. 2 | 35 + 1.25 | 11 | 7.0 | 14 | 7.0 | 9.5 | 15 | 5.5 |

It can be seen in the test results above that combining small amount of silicones (typically 5%) with any of the organic formulations, at significantly lower total demulsifier doses, either reduced the amount of unresolved emulsion (ΔW) or resulted in a similar performance as the organic alone, at the higher dose.

It is understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. A composition comprising
   (I) a silicon containing co-polymer comprising at least one compound having the following molecular formula:

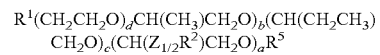

where $R^2$ is a group defined as $M^*_f D^*_g T^*_h Q^*_i R^6_j$, where
$M^* = R^7 R^8 R^9 SiZ_{1/2}$,
$D^* = R^{10} R^{11} SiZ_{2/2}$,
$T^* = R^{12} SiZ_{3/2}$, $Q^*=SiZ_{4/2}$,
$R^6=-(CH_2)_{1/2}(R^{13})_k(CH_2)_{1/2}-$, independently selected;
wherein
- $R^1$ is independently selected from —OH or —OC(O)CH$_3$ or a monovalent hydrocarbon radical having 1 to about 40 carbon atoms and optionally containing heteroatoms and hydroxyl groups,
- $R^5$ is independently selected from hydrogen or a —C(O)CH$_3$ group or a monovalent hydrocarbon radical having 1 to about 40 carbon atoms and optionally containing heteroatoms and hydroxyl groups,
- Z is independently selected from O or CH$_2$ groups, subject to the limitation that the molecule contains an even number of O$_{1/2}$ and even number of (CH$_2$)$_{1/2}$ groups and wherein every O$_{1/2}$ group is paired with another O$_{1/2}$ group and every (CH$_2$)$_{1/2}$ group is paired with another (CH$_2$)$_{1/2}$ group in the molecule,
- $R^7$, $R^8$, $R^9$, $R^{10}$, $R^{11}$ and $R^{12}$ are each independently selected from the group of OR$^{14}$ or monovalent hydrocarbon radicals having 1 to about 20 carbon atoms and optionally containing heteroatoms and hydroxyl groups,
- $R^{13}$ is oxygen or divalent linear or branched, unsaturated or saturated hydrocarbon radical containing at least one and less than about 30 carbon atoms and optionally containing heteroatoms and hydroxyl groups,
- $R^{14}$ is a monovalent, linear or branched, unsaturated or saturated hydrocarbon radical having 1 to about 20 carbon atoms and optionally containing heteroatoms and hydroxyl groups,
- subscripts a, b, and c are zero or positive subject to the limitation 3<a+b+c+d<about 1000,
- subscripts d>1,
- subscripts f, g, h, i and j are 0 or positive subject to the limitation f+g+h+i+j<about 300, and,
- subscript k is either 0 or 1; and, (II) an emulsion wherein the concentration of the silicon containing co-polymer (I) in said composition is from about 0.1 ppm to about 10,000 ppm.

2. The silicon containing co-polymer (I) of claim 1 wherein:
- $R^1$ is independently selected from —OH or —OC(O)CH$_3$ or a monovalent hydrocarbon radical having 1 to about 30 carbon atoms and optionally containing heteroatoms and hydroxyl groups;
- $R^5$ is independently selected from hydrogen or a —C(O)CH$_3$ group or a monovalent hydrocarbon radical having 1 to about 30 carbon atoms and optionally containing heteroatoms and hydroxyl groups;
- $R^7$, $R^8$, $R^9$, $R^{10}$, $R^{11}$ and $R^{12}$ are each independently selected from the group of OR$^{14}$ or monovalent hydrocarbon radicals having 1 to about 15 carbon atoms and optionally containing heteroatoms and hydroxyl groups;
- $R^{13}$ is oxygen or divalent linear or branched, unsaturated or saturated hydrocarbon radical containing at least one and less than about 25 carbon atoms and optionally containing heteroatoms and hydroxyl groups,
- $R^{14}$ is a monovalent, linear or branched, unsaturated or saturated hydrocarbon radical having 1 to about 15 carbon atoms and optionally containing heteroatoms and hydroxyl groups;
- subscripts a, b, and c are zero or positive subject to the limitation 3<a+b+c+d<about 750;
- subscript d>1
- and
- subscripts f, g, h, i and j are 0 or positive subject to the limitation f+g+h+I+j<about 200.

3. The silicon containing co-polymer (I) of claim 1 wherein:
- $R^1$ is independently selected from —OH or —OC(O)CH$_3$ or a monovalent hydrocarbon radical having 1 to about 20 carbon atoms and optionally containing heteroatoms and hydroxyl groups;
- $R^5$ is independently selected from hydrogen or a —C(O)CH$_3$ group or a monovalent hydrocarbon radical having 1 to about 20 carbon atoms and optionally containing heteroatoms and hydroxyl groups;
- $R^7$, $R^8$, $R^9$, $R^{10}$, $R^{11}$ and $R^{12}$ are each independently selected from the group of OR$^{14}$ or monovalent hydrocarbon radicals having 1 to about 10 carbon atoms and optionally containing heteroatoms and hydroxyl groups;
- $R^{13}$ is oxygen or divalent linear or branched, unsaturated or saturated hydrocarbon radical containing at least one and less than about 20 carbon atoms and optionally containing heteroatoms and hydroxyl groups,
- $R^{14}$ is a monovalent, linear or branched, unsaturated or saturated hydrocarbon radical having 1 to about 10 carbon atoms and optionally containing heteroatoms and hydroxyl groups;
- subscripts a, b, and c are zero or positive subject to the limitation 3<a+b+c+d<about 500;
- subscript d>1
- and
- subscripts f, g, h, i and j are 0 or positive subject to the limitation f+g+h+I+j<about 100.

4. The composition of claim 1 wherein said composition further comprises one or more additional organic or silicone demulsifier components and the weight ratio of the silicon containing co-polymer (I) to the total amount of organic and silicone demulsifiers is in the range of about 100:1 to about 1:1000.

5. The composition of claim 1 wherein the concentration of said silicon containing co-polymer (I) in said composition is from about 0.1 ppm to about 1000 ppm.

6. A composition comprising
(I) a silicon containing co-polymer comprising at least one compound having the following molecular formula:

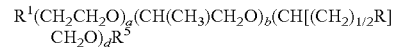

wherein $R^2$ is a group defined as $M^*_2T^*R^6$,
wherein
$M^*=R^7R^8R^9SiO_{1/2}$,
$T^*=R^{12}Si(O)_{2/2}(CH_2)_{1/2}$;
$R^6=-(CH_2)_{1/2}(R^{13})_k(CH_2)_{1/2}-$, independently selected;
subject to the limitation that the molecule contains an even number of O$_{1/2}$ and an even number of (CH$_2$)$_{1/2}$ groups wherein every O$_{1/2}$ group is paired with another O$_{1/2}$ group and every (CH$_2$)$_{1/2}$ group is paired with another (CH$_2$)$_{1/2}$ group in the molecule, wherein
- $R^1$ is independently selected from —OH or —OC(O)CH$_3$ or a monovalent hydrocarbon radical having 1 to about 40 carbon atoms and optionally containing heteroatoms and hydroxyl groups,
- $R^5$ is independently selected from hydrogen or a —C(O)CH$_3$ group or a monovalent hydrocarbon radical having 1 to about 40 carbon atoms and optionally containing heteroatoms and hydroxyl groups, $R^7$, $R^8$, $R^9$ and $R^{12}$ are each independently selected from the group of $OR^{14}$ or monovalent hydrocarbon radicals having 1 to about 20 carbon atoms and optionally containing heteroatoms and hydroxyl groups, $R^{13}$ is oxygen or divalent linear or branched, unsaturated or saturated hydrocarbon radical containing at least one and less than about 30 carbon atoms and optionally containing heteroatoms and hydroxyl groups, $R^{14}$ is a monovalent, linear or branched, unsaturated or saturated hydrocarbon radical having 1 to about 20 carbon atoms and optionally containing heteroatoms and hydroxyl groups, subscripts a, and b are zero or positive subject to the limitation $3<a+b+d<$about 1000, subscripts $d>1$, subscript k is either 0 or 1; and, (II) an emulsion wherein the concentration of the silicon containing co-polymer (I) in said composition is from about 0.1 ppm to about 10,000 ppm.

7. A mining or petroleum processing composition comprising at least one silicon-containing copolymer with the following molecular formula:

$$R^1(CH_2CH_2O)_a CH(CH_3)CH_2O)_b(CH(CH_2CH_3)CH_2O)_c(CH(Z_{1/2}R^2)CH_2O)_a R^5$$

where $R^2$ is a group defined as 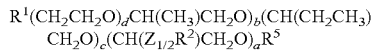, where $M^*=R^7R^8R^9SiZ_{1/2}$,
$D^*=R^{10}R^{11}SiZ_{2/2}$,
$T^*=R^{12}SiZ_{3/2}$,
$Q^*=SiZ_{4/2}$,
$R^6=-(CH_2)_{1/2}(R^{13})_k(CH_2)_{1/2}-$, independently selected;

wherein $R^1$ is independently selected from —OH or —OC(O)CH$_3$ or a monovalent hydrocarbon radical having 1 to about 40 carbon atoms and optionally containing heteroatoms and hydroxyl groups, $R^5$ is independently selected from hydrogen or a —C(O)CH$_3$ group or a monovalent hydrocarbon radical having 1 to about 40 carbon atoms and optionally containing heteroatoms and hydroxyl groups, Z is independently selected from O or CH$_2$ groups, subject to the limitation that the molecule contains an even number of $O_{1/2}$ and even number of $(CH_2)_{1/2}$ groups and wherein every $O_{1/2}$ group is paired with another $O_{1/2}$ group and every $(CH_2)_{12}$ group is paired with another $(CH_2)_{1/2}$ group in the molecule, and that the copolymer contains at least one Si—$R^{15}$—Si group;

$R^{15}$ is a divalent linear or branched, unsaturated or saturated hydrocarbon radical containing 1 to about 30 carbon atoms $R^7$, $R^8$, $R^9$, $R^{10}$, $R^{11}$ and $R^{12}$ are each independently selected from the group of $OR^{14}$ or monovalent hydrocarbon radicals having 1 to about 20 carbon atoms and optionally containing heteroatoms and hydroxyl groups, $R^{13}$ is oxygen or divalent linear or branched, unsaturated or saturated hydrocarbon radical containing at least one and less than about 30 carbon atoms and optionally containing heteroatoms and hydroxyl groups, $R^{14}$ is a monovalent, linear or branched, unsaturated or saturated hydrocarbon radical having 1 to about 20 carbon atoms and optionally containing heteroatoms and hydroxyl groups, subscripts a, b, and c are zero or positive subject to the limitation $3<a+b+c+d<$about 1000, subscripts $d>1$, subscripts f, g, h, i and j are 0 or positive subject to the limitation $f+g+h+i+j<$about 300, and, subscript k is either 0 or 1; and, at least one component used in a mining or petroleum processing application selected from the group consisting of crude oil, oil sands, waste oils, slop oils, oily waste from desalters, motor oil, bunker oil, and diesel fuel.

8. The mining or petroleum processing composition of claim 7 wherein:

$R^1$ is independently selected from —OH or —OC(O)CH$_3$ or a monovalent hydrocarbon radical having 1 to about 30 carbon atoms and optionally containing heteroatoms and hydroxyl groups;

$R^5$ is independently selected from hydrogen or a —C(O)CH$_3$ group or a monovalent hydrocarbon radical having 1 to about 30 carbon atoms and optionally containing heteroatoms and hydroxyl groups;

$R^7$, $R^8$, $R^9$, $R^{10}$, $R^{11}$ and $R^{12}$ are each independently selected from the group of $OR^{14}$ or monovalent hydrocarbon radicals having 1 to about 15 carbon atoms and optionally containing heteroatoms and hydroxyl groups;

$R^{13}$ is oxygen or divalent linear or branched, unsaturated or saturated hydrocarbon radical containing at least one and less than about 25 carbon atoms and optionally containing heteroatoms and hydroxyl groups, $R^{14}$ is a monovalent, linear or branched, unsaturated or saturated hydrocarbon radical having 1 to about 15 carbon atoms and optionally containing heteroatoms and hydroxyl groups;

subscripts a, b, and c are zero or positive subject to the limitation $3<a+b+c+d<$about 750;

subscript $d>1$ and subscripts f, g, h, i and j are 0 or positive subject to the limitation $f+g+h+I+j<$about 200.

9. The mining or petroleum processing composition of claim 7 wherein:

$R^5$ is independently selected from hydrogen or a —C(O)CH$_3$ group or a monovalent hydrocarbon radical having 1 to about 20 carbon atoms and optionally containing heteroatoms and hydroxyl groups;

$R^7$, $R^8$, $R^9$, $R^{10}$, $R^{11}$ and $R^{12}$ are each independently selected from the group of $OR^{14}$ or monovalent hydrocarbon radicals having 1 to about 10 carbon atoms and optionally containing heteroatoms and hydroxyl groups;

$R^{13}$ is oxygen or divalent linear or branched, unsaturated or saturated hydrocarbon radical containing at least one and less than about 20 carbon atoms and optionally containing heteroatoms and hydroxyl groups, $R^{14}$ is a monovalent, linear or branched, unsaturated or saturated hydrocarbon radical having 1 to about 10 carbon atoms and optionally containing heteroatoms and hydroxyl groups;

subscripts a, b, and c are zero or positive subject to the limitation 3<a+b+c+d<about 500;

subscript d>1 and subscripts f, g, h, i and j are 0 or positive subject to the limitation f+g+h+I+j<about 100.

10. The mining or petroleum processing composition of claim 7 wherein the silicon containing co-polymer comprises the compound having the following formula:

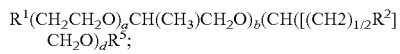

wherein $R^2$ is a group defined as —$R^7R^8R^9Si(CH_2)_m$ $(R^{10})(R^{11})R^{13}(CH_2)_{1/2}$—; and, wherein 1≤m≤about 10.

11. The mining or petroleum processing composition of claim 7 wherein the silicon containing co-polymer comprises the compound having the following formula:

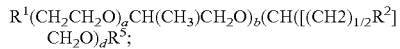

wherein $R^2$ is a group defined as)
$R^7R^8R^9Si(CH_2)_lSi(R^{10})(R^{11})R^{13}(CH_2)_{1/2}$—; and, wherein 1≤l≤about 10.

12. A method for separating emulsions comprising:
(i) blending the composition of claim 1;
(ii) allowing the blended composition to separate into at least two phases; and
(iii) separating said at least two phases from each other.

13. The method for separating emulsions of claim 12 wherein $R^1$ is independently selected from —OH or —OC(O)CH$_3$ or a monovalent hydrocarbon radical having 1 to about 30 carbon atoms and optionally containing heteroatoms and hydroxyl groups;

$R^5$ is independently selected from hydrogen or a —C(O)CH$_3$ group or a monovalent hydrocarbon radical having 1 to about 30 carbon atoms and optionally containing heteroatoms and hydroxyl groups;

$R^7$, $R^8$, $R^9$, $R^{10}$, $R^{11}$ and $R^{12}$ are each independently selected from the group of OR$^{14}$ or monovalent hydrocarbon radicals having 1 to about 15 carbon atoms and optionally containing heteroatoms and hydroxyl groups;

$R^{13}$ is oxygen or divalent linear or branched, unsaturated or saturated hydrocarbon radical containing at least one and less than about 25 carbon atoms and optionally containing heteroatoms and hydroxyl groups, $R^{14}$ is a monovalent, linear or branched, unsaturated or saturated hydrocarbon radical having 1 to about 15 carbon atoms and optionally containing heteroatoms and hydroxyl groups;

subscripts a, b, and c are zero or positive subject to the limitation 3<a+b+c+d<about 750;

subscript d>1 and subscripts f, g, h, i and j are 0 or positive subject to the limitation f+g+h+I+j<about 200.

14. The method for separating emulsions of claim 13 wherein $R^1$ is independently selected from —OH or —OC(O)CH$_3$ or a monovalent hydrocarbon radical having 1 to about 20 carbon atoms and optionally containing heteroatoms and hydroxyl groups;

$R^5$ is independently selected from hydrogen or a —C(O)CH$_3$ group or a monovalent hydrocarbon radical having 1 to about 20 carbon atoms and optionally containing heteroatoms and hydroxyl groups;

$R^7$, $R^8$, $R^9$, $R^{10}$, $R^{11}$ and $R^{12}$ are each independently selected from the group of OR$^{14}$ or monovalent hydrocarbon radicals having 1 to about 10 carbon atoms and optionally containing heteroatoms and hydroxyl groups;

$R^{13}$ is oxygen or divalent linear or branched, unsaturated or saturated hydrocarbon radical containing at least one and less than about 20 carbon atoms and optionally containing heteroatoms and hydroxyl groups, $R^{14}$ is a monovalent, linear or branched, unsaturated or saturated hydrocarbon radical having 1 to about 10 carbon atoms and optionally containing heteroatoms and hydroxyl groups;

subscripts a, b, and c are zero or positive subject to the limitation 3<a+b+c+d<about 500;

subscript d>1 and subscripts f, g, h, i and j are 0 or positive subject to the limitation f+g+h+I+j<about 100.

* * * * *